United States Patent
Al-Harthi et al.

(10) Patent No.: US 11,926,691 B2
(45) Date of Patent: Mar. 12, 2024

(54) METHOD FOR MAKING AND USING A SUPPORTED ZINC ALUMINUM LAYERED DOUBLE HYDROXIDE CATALYST

(71) Applicants: KING FAHD UNIVERSITY OF PETROLEUM AND MINERALS, Dhahran (SA); S-Oil Corporation, Seoul (KR)

(72) Inventors: Mamdouh A. Al-Harthi, Dhahran (SA); Sung-Gil Hong, Seoul (KR); Hassam Mazhar, Dhahran (SA); Farrukh Shehzad, Dhahran (SA)

(73) Assignees: KING FAHD UNIVERSITY OF PETROLEUM AND MINERALS, Dhahran (SA); S-Oil Corporation, Seoul (KR)

( * ) Notice: Subject to any disclaimer, the term of this patent is extended or adjusted under 35 U.S.C. 154(b) by 0 days.

(21) Appl. No.: 18/312,849

(22) Filed: May 5, 2023

(65) Prior Publication Data

US 2024/0034818 A1    Feb. 1, 2024

Related U.S. Application Data

(63) Continuation of application No. 17/877,468, filed on Jul. 29, 2022, now Pat. No. 11,746,164.

(51) Int. Cl.

| | |
|---|---|
| C08F 4/02 | (2006.01) |
| B82Y 30/00 | (2011.01) |
| C08F 4/659 | (2006.01) |
| C08F 4/6592 | (2006.01) |
| C08F 10/02 | (2006.01) |
| C08F 210/16 | (2006.01) |

(52) U.S. Cl.
CPC ............ C08F 4/65912 (2013.01); C08F 4/02 (2013.01); C08F 10/02 (2013.01); B82Y 30/00 (2013.01); C08F 210/16 (2013.01)

(58) Field of Classification Search
CPC ....... C08F 4/02; C08F 4/6592; C08F 4/65927
See application file for complete search history.

(56) References Cited

U.S. PATENT DOCUMENTS

| 10,221,259 B2 | 3/2019 | O'Hare et al. |
| 2015/0246980 A1 | 9/2015 | O'Hare |

FOREIGN PATENT DOCUMENTS

| EP | 3 322 738 B1 | 10/2019 |
| WO | 2021/128063 A1 | 7/2021 |

OTHER PUBLICATIONS

Kenyon, et al. ; Controlling the activity of an immobilised molecular catalyst by Lewis acidity tuning of the support ; Journal of Catalysis, vol. 402 ; pp. 94-100 ; Oct. 2021 ; 7 Pages.
He, et al. ; Organo-modified ZnAl layered double hydroxide as new catalyst support for the ethylene polymerization ; Journal of Colloid and Interface Science, vol. 315, Issue 2 ; pp. 439-444 ; Nov. 15, 2007 ; Abstract Only ; 2 Pages.
Buffet, et al. ; Synthesis and characterisation of permethylindenyl zirconium complexes and their use in ethylene polymerization ; RSC Advances, Issue 106 ; 2015 ; Abstract Only ; 2 Pages.

*Primary Examiner* — Caixia Lu
(74) *Attorney, Agent, or Firm* — Oblon, McClelland, Maier & Neustadt, L.L.P.

(57) ABSTRACT

A method of making a polyolefin nanocomposite including, mixing a zinc-aluminum layered double hydroxide (LDH), and a zirconocene complex in a non-polar solvent to form a first mixture. Prior to the mixing the zirconocene complex is not supported on the zinc-aluminum LDH. The method further includes sonicating the first mixture for at least one hour to form a homogeneous slurry. The method further includes degassing the homogenous slurry and adding at least one olefin gas to form a second mixture. The method further includes adding an aluminoxane catalyst to the second mixture and reacting for at least 10 minutes to form a reaction mixture including the polyolefin nanocomposite. The method further includes separating the polyolefin nanocomposite from the reaction mixture.

20 Claims, 4 Drawing Sheets

METHOD FOR MAKING AND USING A SUPPORTED ZINC ALUMINUM LAYERED DOUBLE HYDROXIDE CATALYST

CROSS-REFERENCE TO RELATED APPLICATIONS

The present application is a Continuation of U.S. application Ser. No. 17/877,468, now allowed, having a filing date of Jul. 29, 2022.

STATEMENT OF PRIOR DISCLOSURE BY THE INVENTORS

Aspects of the present disclosure are described in H. Mazhar, F. Shehzad, S. G. Hong, M. A. Al-Harthi, "Thermal Degradation Kinetics Analysis of Ethylene-Propylene Copolymer and EP-1-Hexene Terpolymer", Feb. 7, 2022; Polymers 14(3), 634, incorporated herein by reference in its entirety.

BACKGROUND

Technical Field

The present disclosure in general is directed to a method of making a polyolefin, and particularly, to a method of making a polyolefin nanocomposite with a layered double hydroxide.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

Polyolefins offer a wide range of domestic and industrial applications with an estimated production of more than 186 million metric tons [T. J. Hutley, M. Ouederni, Polyolefins—the history and economic impact, 13-50, 2016], and are a major fraction of plastic materials. Zeigler-Natta catalysts are typically used in the mass production of polyethylene (PE) and α-olefins for polymerization and include an aluminoxane activator with a metallocene transition metal catalyst. Metallocene catalysts present a well-defined active site, yielding polymers with a narrow molecular weight distribution [G. G. Hlatky, Heterogeneous single-site catalysts for olefin polymerization, Chem. Rev. 100 (2000) 1347-1376]. Variation in complexation and addition of a bridging group around a central metal of the catalyst can control the yield of the polymer produced [G. E. Hickman, C. M. R. Wright, A. F. R. Kilpatrick, Z. R. Turner, J. C. Buffet, D. O' Hare, Synthesis, characterisation and slurry phase ethylene polymerisation of rac-(PhBBI*) $ZrCl_2$ immobilised on modified layered double hydroxides, Mol. Catal. 468 (2019) 139-147]. Therefore, the catalyst is selected based on the targeted product.

In recent years, developments in polymer nanocomposites have received immense attention. The incorporation of nanomaterials such as carbon nanotubes, nanosheets, and graphene, as fillers in a polymer matrix has led to enhanced physical properties [A. Verma, A. Parashar, M. Packirisamy, Atomistic modeling of graphene/hexagonal boron nitride polymer nanocomposites: a review, Wiley Interdiscip. Rev. Comput. Mol. Sci. 8 (2018)]. Further, layered double hydroxides (LDHs) are increasingly being used for their ease of preparation, low cost, stability, and easily tailored properties. LDHs in LDH/polymer nanocomposites, improve thermal and mechanical properties, because the LDH as a filler acts as a heat sink due to an LDH endothermic decomposition reaction. [Q. Wang, D. Ohare, Recent advances in the synthesis and application of layered double hydroxide (LDH) nanosheets, Chem. Rev. 112 (2012) 4124-4155]. Therefore, the LDH prevents degradation of the polyolefin or other reaction components.

For desired enhanced mechanical and thermal properties of a polymer, usually, a high molecular weight polymer molecule is targeted, however, the processing of such polymers is troublesome due to their very high melting viscosity [T. K. Han, H. K. Choi, D. W. Jeung, Y. S. Ko, S. I. Woo, Control of molecular weight and molecular weight distribution in ethene polymerization with metallocene catalysts, Macromol. Chem. Phys. 196 (1995) 2637-2647]. An alternative to the above process is obtaining a high molecular distribution in a polymer, which can be achieved by the formation of long-chain branching or incorporation of nanofillers in the polymer. From the processing perspective, a polymer with a low melting viscosity is desired for easy handling [T. K. Han, H. K. Choi, D. W. Jeung, Y. S. Ko, S. I. Woo, Control of molecular weight and molecular weight distribution in ethene polymerization with metallocene catalysts, Macromol. Chem. Phys. 196 (1995) 2637-2647; D. Yan, W.-J. Wang, S. Zhu, Effect of long chain branching on rheological properties of metallocene polyethylene, Polymer (Guildf). 40 (1999) 1737-1744].

Although numerous methods such as solution casting, melt blending, and in-situ polymerization have been used in the past to attain uniform dispersion of nanomaterials in the polymer matrix [R. Verdejo, M. M. Bernal, L. J. Romasanta, M. A. Lopez-Manchado, Graphene filled polymer nanocomposites, J. Mater. Chem. 21 (2011) 3301-3310; Q. Wang, D. O'Hare, Recent advances in the synthesis and application of layered double hydroxide (LDH) nanosheets, Chem. Rev. 112 (2012) 4124-4155], there still exists a need to develop a method to intensify the dispersion of the fillers within the polymer composites, in a homogenous manner, with desired property enhancements.

It is one object of the current disclosure to describe a method of making a polyolefin with a nanomaterial dispersed in the polymer matrix, referred to as a polyolefin nanocomposite. It is another object of the current disclosure to develop a method of making a polyolefin nanocomposite with an LDH dispersed in the polymer matrix. It is another object of the current disclosure to develop a method of making a polyolefin nanocomposite with an LDH homogeneously dispersed in the polymer matrix. It is another object of the current disclosure to develop a method of making a polyolefin nanocomposite with a high molecular weight distribution. It is another object of the current disclosure to develop a method of making a polyolefin nanocomposite with a low melting viscosity and using the polyolefin nanocomposite to catalyze the reaction of one or more olefins to form a polyoflein and/or a polyolefin copolymer.

SUMMARY

In an exemplary embodiment, a method of making a polyolefin nanocomposite is described. The method includes mixing a zinc-aluminum layered double hydroxide (LDH), and a zirconocene complex in a non-polar solvent to form a first mixture. The zirconocene complex prior to the mixing is not supported on the zinc-aluminum LDH. The method further includes sonicating the first mixture for at least one hour to form a homogeneous slurry. The method further includes degassing the homogenous slurry and adding at least one olefin gas to form a second mixture. The method further includes adding an aluminoxane catalyst to the second mixture and reacting for at least 10 minutes to form a reaction mixture including the polyolefin nanocomposite. The method further includes separating the polyolefin nanocomposite from the reaction mixture. The LDH is homogeneously dispersed in the polyolefin nanocomposite.

In some embodiments, the zirconocene complex is dichloro[rac-ethylenebis(indenyl)] zirconium (IV).

In some embodiments, the aluminoxane catalyst is methylaluminoxane.

In some embodiments, the olefin gas is selected from the group consisting of ethene, propene, and butene.

In some embodiments, the olefin gas is 70-95 volume percent (v %) ethene and 5-30 v % propene based on a total volume of the at least one olefin gas.

In some embodiments, the at least one olefin gas has a pressure of 1-10 pound-force per square inch (psi) in the second mixture.

In some embodiments, the first mixture has a weight ratio of the zirconocene complex to the zinc-aluminum LDH of 1 to 1-10.

In some embodiments, the first mixture has a zinc-aluminum LDH concentration of 0.1-0.5 milligram per milliliter (mg/mL).

In some embodiments, the sonicating of the first mixture is performed at a power of 90-130 watts (W).

In some embodiments, the sonicating of the first mixture is performed at a power of about 120 W.

In some embodiments, the sonicating of the first mixture is performed at a frequency of 20-40 kilohertz (kHz).

In some embodiments, the sonicating of the first mixture is performed at a frequency of about 35 kHz.

In some embodiments, the sonicating of the first mixture is performed for 1-5 hours.

In some embodiments, the sonicating of the first mixture is performed for about 3 hours.

In some embodiments, the polyolefin nanocomposite has 0.05 to 3 wt. %, of the zinc-aluminum LDH relative to a total weight of the polyolefin nanocomposite.

In some embodiments, the method further includes mixing the polymer nanocomposite with an olefin feed gas comprising at least two olefins to form a polyolefin co-polymer having a bimodal molecular weight distribution.

In some embodiments, the polyolefin co-polymer has at least two melting temperatures.

In some embodiments, the polyolefin co-polymer has a melting temperature from 100 to 118 degrees Celsius (° C.).

In some embodiments, the polyolefin co-polymer has a higher short chain branch distribution than a polyolefin co-polymer made by the same method but without sonicating the first mixture.

In some embodiments, the polyolefin co-polymer has a lower crystallinity than a polyolefin co-polymer made by the same method but without sonicating the first mixture.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

A "nanocomposite" is a multiphase solid material where at least one of the phases has one, two or three dimensions of less than 100 nanometers, or structures having nano-scale repeat distances between the different phases that make up the material. In the broadest sense this definition can include porous media, colloids, gels and copolymers, but is more usually taken to mean the solid combination of a bulk matrix and a nano-dimensional phase differing in properties due to dissimilarities in structure and chemistry. In general, the mechanical, electrical, thermal, optical, electrochemical, catalytic properties of the nanocomposite will differ from that of the individual component materials.

As used herein, the term 'polyolefin' refers to a polymer with a general formula $(CH_2CHR)_n$ where R is an alkyl group. Polyolefins are formed through the polymerization of olefins, also referred to as olefin monomers. Examples of olefins include but are not limited to, ethene, propene, and butene. A polyolefin may be a copolymer of different types of olefin monomers, for example polymerized ethene and propene.

Aspects of the present disclosure are directed toward an ultrasonic dispersion method for the incorporation of a layered double hydroxide (LDH) into the polymerization of an olefin gas to yield a polyolefin nanocomposite. The polyolefin nanocomposite thus produced contains a LDH nanocomposite dispersed in a matrix of polyolefin, for example polyethylene. The polyolefin nanocomposite obtained by the method of the present disclosure has a higher short chain branch distribution and a lower crystallinity than the polyolefin nanocomposites made without sonication.

Figure 1:
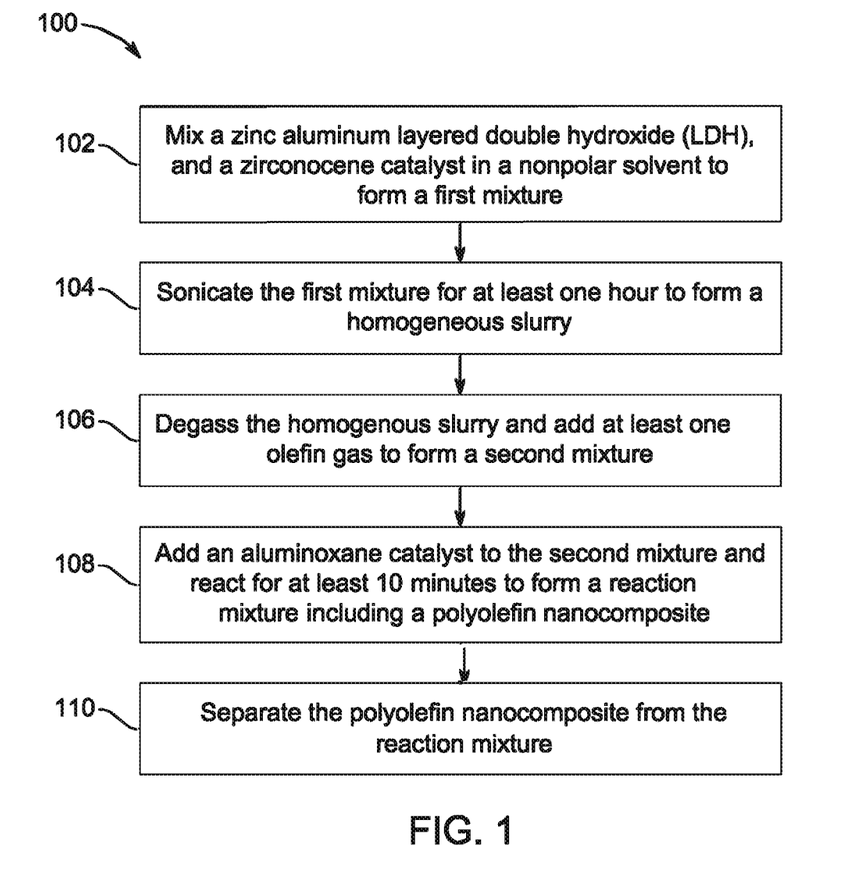
FIG. 1 is a schematic flow diagram of a method of making a polyolefin nanocomposite, according to certain embodiments of the present disclosure.

Referring to FIG. 1, a schematic flow diagram of a method 100 of making a polyolefin nanocomposite is illustrated. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing a zinc-aluminum LDH, and a metallocene complex in a nonpolar solvent to form a first mixture. In some embodiments, the zinc-aluminum LDH, and the zirconocene complex are mixed in a reactor with the nonpolar solvent under a nitrogen or argon environment, to obtain the first mixture. The metallocene catalyst may be a Ziegler-Natta polymerization complex useful for catalyzing olefin polymerization reactions from olefin monomers such as ethene, propene, n-butene, 1-hexene, 1-octene as well as higher homologs and other olefin-containing compounds such as 1,3-butadiene. While any known heterogeneous Ziegler-Natta catalysts may be used, in preferred embodiments, the Ziegler-Natta catalyst is a homogeneous catalyst, for example, a metallocene catalyst based on complexes of Ti, Zr or Hf. and which may be employed in combination with an organoaluminum co-catalyst (e.g., methylaluminoxane, MAO). The combination of metallocene complex and organoaluminum co-catalysts renders these catalyst mixtures soluble in a wide array of common organic solvents, hence their classification as homogeneous catalysts. A metallocene is type of sandwich compound, based on an organometallic complex featuring a metal bound by haptic covalent bonds to two arene ligands. A metallocene is a compound typically containing two substituted or unsubstituted cyclopentadienyl anions (i.e., "cp" which is $C_5H_5^-$) bound to a metal center (M) in the oxidation state II or IV, with the resulting general formula $(C_5H_5)_2M$ or $(C_5H_5)_2MX_2$, e.g., titanocene dichloride, vanadocene dichloride. When the metal of the metallocene is zirconium, the complex is then referred to as zirconocene. In an embodiment, the metallocene complex is zirconocene. In an embodiment, the zirconium has an oxidation state of −2, 0, 1, 2, 3, or 4. In an embodiment, the zirconium has an oxidation state of 4. In an embodiment, the zirconocene complex is any zirconocene complex known in the art. In an embodiment, is the zirconocene complex is dichloro[rac-ethylenebis(indenyl)] zirconium (IV), dimethylsilylbis-(indenyl)zirconium dichloride, cyclopropylsilyl-bis(indenyl)-zirconium dichloride, or zirconocene dichloride. In some embodiments, the zirconium (IV) complex is dichloro[rac-ethylenebis(indenyl)] zirconium (IV).

Fillers are particles added to materials, such as plastics, to engender superior properties of the mixed material. Further, fillers may affect the process by which a material or mixed material is processed, making production more efficient, more facile, higher yielding etc. Fillers, and in particular nanofillers (i.e., added materials with at least one dimension of less than 100 nm) change the properties of the material to which they are added, and/or affect the process by which the mixed material is produced or manufactured. In the methods described herein, a nanofiller is preferably included as a component of a polymerization mixture during a polymerization reaction and thus the nanofiller component is homogeneously dispersed in the polymer matrix as the polymer chain grows. Because the compositing between the nanofiller and the polymer occurs while the polymer chain is being formed, such a method is referred to as "in-situ polymerization". As will become clear, the presence the nanofiller during polymerization impacts the structure and properties of the polymer/nanofiller nanocomposite produced. In preferred embodiments, enough nanofiller is employed in the polymerization method so as to produce a polyolefin nanocomposite having 0.05 to 3 wt. %, preferably 0.1 to 3 wt. %, preferably 0.2 to 3 wt. %, preferably 0.4 to 2.5 wt. %, preferably 0.6 to 2 wt. %, preferably 0.8 to 1.8 wt. %, preferably 1 to 1.6 wt. % of the nanofiller (e.g., ZnAl LDH) relative to a total weight of the polyolefin nanocomposite.

In some embodiments, the filler is an LDH. LDHs are a class of ionic solids characterized by a layered structure with the generic layer sequence $[AcBZAcB]_n$, where c represents layers of metal cations, A and B are layers of hydroxide (HO$^-$) anions, and Z are layers of other anions and neutral molecules (such as water). Lateral offsets between the layers may result in longer repeating periods. LDHs can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. LDHs may be formed with a wide variety of anions in the intercalated layers (Z), such as dodecyl sulfate (DDS) ($CH_3(CH_2)_{11}OSO_3$), $Cl^-$, $Br^-$, $NO_3^-$, $CO_3^{2-}$, $SO_4^{2-}$ and $SeO_4^{2-}$.

An LDH may be synthetic or a naturally-occurring layered double hydroxide. Naturally-occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In preferred embodiments, the layered double hydroxide has a positive layer (c) which contains both divalent and trivalent cations. In an embodiment, the divalent ion is selected from the group consisting of $M^{2+}$ is $Ca^{2+}$, $Mg^{2+}$, $Mn^{2+}$, $Fe^{2+}$, $Cu^{2+}$, $Ni^{2+}$, $Cu^{2+}$, and/or $Zn^{2+}$, preferably $Zn^{2+}$. In an embodiment, the trivalent ion is selected from the group consisting of $N^{3+}$ is $Al^{3+}$, $Mn^{3+}$, $Cr^{3+}$, $Sc^{3+}$, $Ga^{3+}$, $La^{3+}$, $Sb^{3+}$, $Y^{3+}$, $In^{3+}$, $Co^{3+}$ and/or $Ni^{3+}$, preferably $Al^{3+}$. In an embodiment, the anion in Z is DDS.

In preferred embodiments, the layered double hydroxide is a Zn(II)/Al(III) layered double hydroxide (zinc-aluminum LDH or ZnAl LDH), where some $Zn^{2+}$ in a brucite-like structure (crystalline $Zn(OH)_2$) is substituted by $Al^{3+}$. In an embodiment, a molar ratio of Zn(II) to Al(III) in the Zn(II)Al(III) layered double hydroxide is from 2:1 to 4:1, preferably 2.4:1 to 3.8:1, preferably 2.8:1 to 3.2:

In an embodiment, the layered double hydroxide component may have a particulate form, for example in the form of spheres, granules, whiskers, sheets, flakes, plates, foils, fibers, and the like. In some embodiments, he layered double hydroxide particles may have a particle size of 40 to 100 nm, preferably 45 to 90) nm, preferably 50 to 80 nm, preferably 55 to 75 nm, preferably 60 to 70 nm. In some embodiments, the layered double hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered double hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm.

In some embodiments, the non-polar solvent is an aromatic solvent, most preferably an aromatic hydrocarbon. Exemplary aromatic solvents include, but are not limited to, benzene, ethylbenzene, o-xylene, m-xylene, p-xylene, and mixtures of xylenes, toluene, mesitylene, anisole, 1,2-dimethoxybenzene, $\alpha,\alpha,\alpha$,-trifluoromethylbenzene, and fluorobenzene. In some embodiments, the organic solvent is an alkane solvent. Exemplary alkane solvents include, but are not limited to, pentane, cyclopentane, hexanes, cyclohexane, heptanes, cycloheptane, and octanes. In preferred embodiments, the organic solvent is toluene. Other organic solvents that me be used, particularly as co-solvents, include ethers (e.g. diethyl ether, tetrahydrofuran, 1,4-dioxane, tetrahydropyran, t-butyl methyl ether, cyclopentyl methyl ether, di-isopropyl ether), glycol ethers (e.g. 1,2-dimethoxyethane, diglyme, triglyme), chlorinated solvents (e.g. chlorobenzene, dichloromethane, 1,2-dichloroethane, 1,1-dichloroethane, chloroform, carbon tetrachloride), ester solvents (e.g. ethyl acetate, propyl acetate), ketones (e.g. acetone, butanone). Mixtures of any of the above organic solvents may also be utilized.

The amount of organic solvent employed may be varied, but typically the organic solvent may be added so that the complex has a concentration in the organic solvent of 0.01 to 10 mM, preferably 0.05 to 5 mM, preferably 0.1 to 0.5 mM, preferably 0.15 to 0.4 mM, preferably 0.2 to 0.3 mM. In some embodiments, enough organic solvent is added to the polymerization mixture so that the weight of the LDH (mg) to volume of solvent (mL) is 0.1 to 2 mg/mL, preferably 0.5 to 1 mg/mL, preferably 0.75 to 1.5 mg/mL. In an embodiment a weight ratio of the zirconocene complex to the weight ratio of zinc-aluminum LDH in the first mixture is in the range of 1 to 1-10, preferably, 1 to 10, 1 to 9, 1 to 9, 1 to 7, 1 to 6, 1 to 5, 1 to 4, 1 to 3, 1 to 2, or 1 to 1.

In an embodiment, the zirconocene complex is not supported on the zinc-aluminum LDH. In some embodiments, neither of the zirconocene complex or the aluminoxane catalyst (discussed later) are pre-reacted or pre-supported onto the LDH. Rather, the un-treated LDH is added to the polymerization reaction as a separate reaction component. This is because, even though the method may involve adding together the zirconocene complex and the LDH prior to reaction initiation, pre-reacting or pre-supporting the zirconocene complex onto the LDH may not leave enough open sites for the olefin monomer for chain elongation. Therefore, in preferred embodiments, the zirconocene complex, the aluminoxane catalyst, and the LDH are all added as separate components, and any reaction or depositing between these components takes place in situ during the polymerization process.

At step 104, the method 100 further includes sonicating the first mixture for at least one hour to form a homogeneous slurry. As used herein, the term 'sonicating' refers to the process which uses sound waves for agitating particles present in a solution. In some embodiments, a water bath sonicator is used. In some embodiments, a probe sonicator may also be used. The first mixture is sonicated at a power of 90-130 watts (W), preferably, 120 W; for a period of 1-5 hours, preferably, 3 hours; at a frequency of 20-40 kilohertz (kHz), preferably, 35 kHz. One of the features that affect the properties of the polyolefin nanocomposite, prepared by the method of the present disclosure is the duration of the sonication time. No sonication yields a unimodal polymer, however, at higher sonication times, such as at about 3 hours, a bimodal copolymer is obtained. As used herein, the term 'bimodal composition' refers to the composition having at least two polymer components. This is because at higher sonication intervals, there are effective interactions between the LDH and zirconocene complex of the first mixture. In an embodiment, by sonicating the first mixture, the LDH is homogenously distributed throughout the slurry. In an embodiment, following sonication, the LDH and zirconocene complex interact via electrostatic (e.g., van der Waals), mechanical forces, or both. In some embodiments, the zirconocene complex may be physically dispersed (i.e., no chemical reactions) within the layers of the LDH. In an embodiment, the zirconocene complex electrostatically interacts with the anions of the LDH. Preferably, the zirconocene is homogeneously dispersed in the LDH.

At step 106, the method 100 further includes degassing the homogenous slurry and adding at least one olefin gas to form a second mixture. Preferably, the olefin gas contains at least one $\alpha$-olefin group but may contain more than one in the case of diene or polyene monomers. The olefin gas may be a single monomer if a homopolymer nanocomposite is desired or a mixture of monomers if a copolymer nanocomposite is desired. Olefins suitable for polymerization reactions are known to those of ordinary skill and may include olefin monomers having 2 to 12 carbons, preferably 3 to 10 carbons, preferably 4 to 8 carbons, preferably 5 to 6 carbons, examples of which include ethene, propene, butene, isobutene, 1,3-butadiene, 1-pentene, 1-hexene, hexadiene, 1-octene, 1-decene, isoprene, styrene, 4-methylpent-1-ene, and the like. In an embodiment, the at least one olefin gas is selected from the group consisting of ethene, propene, and butene. In an embodiment, the at least one olefin gas includes 70-95 volume percent (v %) ethene and 5-30 v % propene based on a total volume of the olefin gas. In an alternate embodiment, the at least one olefin gas may be 80-85 v % ethene and 15-25 v % propene based on the total volume of the at least one olefin gas. In an embodiment, the at least one olefin gas is introduced into the homogeneous slurry under positive pressure, for example from 1 to 10 bar, preferably 2-9 bar, 3-8 bar, 4-7 bar, or 5-6 bar. In some embodiments, the polymerization mixture may be fully saturated or partially saturated with gaseous olefin monomer. Preferably, the olefin monomer is added to the polymerization mixture until saturation. The quantity of the olefin(s) added into the polymerization mixture may be controlled and adjusted in order to control the molecular weight and branching of the polyolefin produced.

At step 108, the method 100 further includes adding an aluminoxane catalyst to the second mixture and reacting for at least 10 minutes to form a reaction mixture including the polyolefin nanocomposite. The metallocene complex in a Ziegler-Natta polymerization reaction may be accurately referred to as a pre-catalyst, it is not responsible for the catalytic polymerization. Instead, the metallocene or zirconocene converts to the active catalyst in-situ after reaction with a co-catalyst. A co-catalyst is a chemical species that acts upon a catalyst for reaction to occur, or that improves the catalytic activity of a catalyst by acting as a promoter in a cooperative catalytic process. In the Ziegler-Natta reaction, the co-catalyst may be an organoaluminum compound which performs a ligand exchange reaction with the metallocene complex, ultimately forming a cationic metal species that catalyzes the olefin polymerization reaction. In the present method, the organoaluminum co-catalyst may be an aluminoxane co-catalyst. In some embodiments, the aluminoxane catalyst is methylaluminoxane, ethylaluminoxane, propylaluminoxane, or butylaluminoxane. In a preferred embodiment, the aluminoxane catalyst is methylaluminoxane.

In an embodiment, a weight ratio of the aluminoxane catalyst to the zirconocene complex is 30:1 to 70:1, preferably 35:1 to 65:1, preferably 40:1 to 60:1, preferably 45:1 to 55:1, preferably 50:1 to 53:1, preferably about 52:1. In an embodiment, a weight ratio of the aluminoxane co-catalyst to the LDH is 1:1 to 10:1, preferably 2:1 to 8:1, preferably 3:1 to 6:1, preferably 4:1 to 5:1. The aluminoxane co-catalyst is preferably added to the polymerization mixture as a solution in organic solvent (e.g., in toluene), most preferably, the aluminoxane co-catalyst is the last component added to the polymerization reaction.

Other organoaluminum co-catalysts may be utilized in addition to, or in lieu of, the alkylaluminoxane co-catalysts above, examples of which include the C1-C12 trialkylaluminum compounds described above (e.g., trimethylaluminum, triethylaluminum, triisopropylaluminum, tri-n-propylaluminum, triisobutylaluminum, tri-n-pentylaluminum, trioctylaluminum), C1-C12 dialkylaluminum monohalides (e.g., diethylaluminum monochloride, diethylaluminum monobromide, diethylaluminum monoiodide, diisopropylaluminum monochloride, diisobutylaluminum monochloride, and dioctylaluminum monochloride), C1-C12 alkylaluminum sesquihalides (e.g., methylaluminum sesquichloride, ethylaluminum sesquichloride, ethylaluminum sesquibromide, and butylaluminum sesquichloride), as well as mixtures thereof.

In some embodiments, the polymerization reaction is for at least 10 minutes, preferably 30 mins, 1 hour, 2 hours, 3 hours, 4 hours, 5 hours, 6 hours, 7 hours, 8 hours, 9 hours, 10 hours, 11 hours, 12 hours, or 24 hours. In an embodiment, the reaction is quenched with an acid and/or an alcoholic solvent, for example, acidic methanol. In an embodiment, the reaction is quenched by washing with methanol including 4-6% HCl.

In an embodiment, the polymerization reaction may be performed at room temperature or at elevated temperature, for example, the polymerization mixture may be optionally heated up to 100° C., preferably up to 80° C., preferably up to 60° C., preferably up to 40° C., preferably up to 30° C.

At step 110, the method 100 further includes separating the polyolefin nanocomposite from the reaction mixture. In some embodiments, the polyolefin nanocomposite is separated by any method known to those with skill in the art. In some embodiments, the polyolefin nanocomposite is separated from the reaction mixture via filtration or centrifugation. In some embodiments, the filtered polyolefin nanocomposite is further dried for a range of 35° C. to 45° C. for a time duration of 10-20 hours, preferably 12-18, or 14-16 hours.

The method may be referred to as an "in-situ polymerization" method because the LDH is present during the formation of the polyolefin. In this method, the olefin monomer(s) and/or catalyst may be adsorbed in the gaps of the LDH where polymerization occurs. For example, the zirconocene complex may enter the gaps in the nanofiller, resulting in increased gap sizes, which then enables the olefin monomer (e.g., ethene) to diffuse freely into the gaps to contact the metal center of the zirconocene complex. In an embodiment, sonication of the first mixture with the LDH and zirconocene complex, promotes the diffusion of the zirconocene complex into the gaps of the LDH. In some embodiments, the olefin monomer may enter the gaps in the nanofiller, resulting in increased gap sizes, which then enables the zirconocene complex to diffuse freely into the gaps to contact olefin monomers for the polymerization reaction. Further, localized heat may be generated during the polymerization which may aid the homogeneous dispersion of the LDH in the polyolefin matrix. This along with the sonication, results in the LDH being evenly distributed in the polymer matrix as the polyolefin chain grows, resulting in a polyolefin nanocomposite where the LDH is homogeneously dispersed in the polyolefin matrix.

In the polyolefin nanocomposite thus produced, the LDH may interact with the polyolefin (e.g., polyethylene) via electrostatic (e.g., van der Waals), mechanical forces, or both. In some embodiments, the LDH interacts with the polyolefin through van der Waals forces, for example, through interactions with the C—C backbone of the polyolefin. In some embodiments, the LDH may be physically dispersed (i.e., no chemical reactions) within the polyolefin matrix. Preferably, the LDH is homogeneously dispersed within the polymer matrix and may disrupt intermolecular interactions between polymer chains.

The presence of the LDH in the polymerization mixture may stabilize the zirconocene complex leading to different properties of the polyolefins compared to cases where no nanofiller is employed. Further, this stabilization is amplified in the embodiment where the LDH and zirconocene catalyst are sonicated together prior to the polymerization reaction, also referred to as sonication assisted. In an embodiment, if the LDH and zirconocene complex are sonicated the resulting polyolefin has a bimodal composition. In an embodiment, if the LDH and zirconocene complex are sonicated the resulting polyolefin nanocomposite has a bimodal, trimodal, or any multimodal composition. In an embodiment, if the LDH and zirconocene complex are not sonicated the resulting polyolefin nanocomposite has a unimodal composition. In an embodiment, if the LDH is not present, the resulting polyolefin has a unimodal composition. In an embodiment, the resulting multimodal distribution of the polyolefin reflects variation in its chemical composition distribution (CCD), which is also referred as short chain branch distribution (SCBD). In some embodiments, the sonication assisted polymerization stimulates the entrainment of lower molecular weight (MW) components or SCBD and hence produces a polymer with a broad CCD. In some embodiments, a sonication assisted polyolefin nanocomposite has a higher short chain branch distribution than a polyolefin nanocomposite made by the same method but without sonicating the first mixture. In an embodiment, the increase in SCBD in the sonication assisted polyolefin nanocomposite allows for ease of processing in manufacturing applications.

In some embodiments, the polyolefin nanocomposite may be used as a catalyst for reacting further amounts of the same monomers, or different amounts of different monomers. Preferably the catalysis forms a polyolefin co-polymer that contains the polymer nanocomposite in minor amounts, e.g., trace amounts such as from 0.01 to 100 ppm, preferably from 0.1 to 50 ppm or from 1 to 25 ppm based on weight.

In some embodiments, the sonication assisted polyolefin nanocomposite and/or polyolefin co-polymer has a lower melting temperature than a polyolefin made by the same method but without sonication and/or contains a polyolefin having a lower melting temperature than a polyolefin made by the same method but without sonication. In some embodiments, the sonication assisted polyolefin nanocomposite and/or polyolefin co-polymer has a lower melting temperature than a polyolefin made by the same method but without an LDH present and/or contains a polyolefin having a lower melting temperature than a polyolefin made by the same method but without an LDH present. In some embodiments, the sonication assisted polyolefin nanocomposite and/or polyolefin co-polymer has at least two melting temperatures. In some embodiments, the sonication assisted polyolefin nanocomposite and/or polyolefin co-polymer has 2, 3, 4, 5, or 6 melting temperatures. In some embodiments, the sonication assisted polyolefin nanocomposite and/or polyolefin co-polymer has melting temperatures of 90 to 130° C., preferably 95 to 125° C., 100 to 120° C., 105 to 115° C., or 108 to 110° C. In some embodiments, the sonication assisted polyolefin nanocomposite and/or polyolefin co-polymer has melting temperatures of 100 to 118° C., preferably 102 to 116° C., 104 to 114° C., 106 to 112° C., or 108 to 110° C. In some embodiments, the sonication assisted polyolefin nanocomposite and/or polyolefin co-polymer has a first melting temperature of 90 to 110° C., preferably 93 to 107° C., 96 to 104° C., or approximately 100° C., and a second melting temperature of 110 to 130° C., preferably 115 to 125° C., or approximately 120° C.

In some embodiments, the sonication assisted polyolefin nanocomposite and/or polyolefin co-polymer has a lower crystallinity than a polyolefin nanocomposite made by the same method but without sonicating the first mixture. In some embodiments, polymers with a high value of SCBD exhibit relatively low crystallinity than the long chain polymer nanocomposites. Such polymers composite offer ease in processing and can be applied for targeted applications.

In some embodiments, the sonication assisted polyolefin nanocomposite and/or polyolefin co-polymer has a lower crystallization temperature than a polyolefin made by the same method but without sonication. In some embodiments, the sonication assisted polyolefin nanocomposite and/or polyolefin co-polymer has a lower crystallization temperature than a polyolefin made by the same method but without an LDH present. In some embodiments, the sonication assisted polyolefin nanocomposite and/or polyolefin co-polymer has at least two crystallization temperatures. In some embodiments, the sonication assisted polyolefin nanocomposite and/or polyolefin co-polymer has 2, 3, 4, 5, or 6 crystallization temperatures. In some embodiments, the sonication assisted polyolefin nanocomposite and/or polyolefin co-polymer has crystallization temperatures of 80 to 120° C., preferably 85 to 115° C., 90 to 110° C., or approximately 95° C. In some embodiments, the sonication assisted polyolefin nanocomposite and/or polyolefin co-polymer has a first crystallization temperature of 85 to 100° C., preferably 88 to 98° C., or 90 to 95° C., a second crystallization temperature of 95 to 105° C., preferably 97 to 103° C., or approximately 100° C., and a third crystallization temperature of 105 to 115° C., preferably 107 to 113° C., or approximately 110° C. In an embodiment, the multiple crystallization temperatures of the sonication assisted polyolefin nanocomposite and/or polyolefin co-polymer indicates a high value of SCBD.

In preferred embodiments, the polyolefin nanocomposite consists of the LDH and the polyolefin. In some embodiments, the polyolefin nanocomposite consists essentially of the LDH and the polyolefin, with insignificant amounts of the metallocene catalysts or byproducts thereof also being present, but which do not materially affect the composition or properties of the polyolefin nanocomposite. In some embodiments, the LDH is the only inorganic material present.

Further, the polyolefin nanocomposite and/or polyolefin co-polymer may be additionally altered after formation to instill any desired polymer properties. The additional alterations may comprise any post polymerization technique that modifies polymeric properties, such as vulcanization, grafting, and/or cross-linking. Further polymer processing techniques, such as blow molding, thermoforming, coating, extrusion, injection molding, fiber spinning, filament winding, pultrusion, and the like are considered to be within the scope of the present method.

After the in-situ polymerization, the polyolefin nanocomposite and/or polyolefin co-polymer may be manipulated/manufactured to have any desired shape. For example, the polyolefin nanocomposite may be manufactured to be in the form of sheets, particles, granules, extrudates, lumps, spheres, spheroids, cubes, cuboids, rods, fibers, flakes, plates, tubes or other hollow shapes, polygons, pipes, hose, wire, cable or any other desirable shape. For example, the polyethylene nanocomposite may be subject to known plastic processing steps, and thus may be melted, blended, extruded, molded, compressed, casted, cooled, solidified, etc. to have any desirable shape suitable for a particular application.

EXAMPLES

The following examples describe and demonstrate exemplary embodiments of the method 100 of making the polyolefin nanocomposite and/or polyolefin co-polymer described herein. The examples are provided solely for the purpose of illustration and are not to be construed as limitations of the present disclosure, as many variations thereof are possible without departing from the spirit and scope of the present disclosure.

Materials Required

Ethene and propene (EP) (95:05) gas mixture with 99% purity, dimethylsilylbis(1-indenyl)zirconocene dichloride (bridge catalyst), methylaluminoxane (MAO), zinc nitrate hexahydrate [$Zn(NO_3)_2 \cdot 6H_2O$], Aluminum (III) nitrate nonahydrate [$Al(NO_3)_3 \cdot 9H_2O$], sodium dodecyl sulphate toluene, ethanol, methanol and water-bath sonicator were used.

Example 1: Synthesis of ZnAl LDH

A co-precipitation process was used to synthesize ZnAl LDH starting from mixing Zn and Al precursor salts with Zn/Al mole ratio of 3 in 50 ml deionized water at 60° C. and the solution was stirred for 15 minutes. The solution was then transferred to another solution of 0.0187 moles of sodium dodecyl sulfate (SDS) in 50 ml of deionized water in a dropwise manner. The pH was kept constant at 10±0.1 by 2M NaOH solution. The final reaction mixture was stirred and refluxed at 70° C. for 24 hours followed by centrifugation and washing with DI water until a pH of 7 was obtained. The final solid product (ZnAl LDH) was vacuum dried at 50° C. for 24 hours which was later crushed and sieved. Prior to the application as a drop-in filler in the polymerization the ZnAl LDH powder was heated under nitrogen environment at 150° C. under nitrogen for 6 hours.

Example 2: Co-Polymerization of EP without Sonication

A polymerization reaction of the ZnAl LDH and ethene/propene was carried out in a Schlenk flask at a temperature of 60° C. and at a feed gas pressure of 5 psi under a vigorous stirring conditions. Initially, dichloro[rac-ethylenebis(indenyl)] zirconium (IV) complex (8.6 mg, 20 micromole (μmol)), and LDH (15 mg) were charged in a reactor with 80 ml toluene solvent under a nitrogen environment. Before starting the polymerization reaction, nitrogen already present in the reactor was evacuated through a vacuum pump followed by feed gas (95:05 EP) saturation at 5 psi pressure. Post 10 minutes of the feed gas saturation in the toluene solvent, 5 ml MAO co-catalyst was injected to start the polymerization reaction. The reaction was carried out for 30 minutes followed by quenching with 100 ml of methanol containing 5% HCl for 45 minutes. The product was washed with an excess of methanol and filtered, and a final product was obtained after drying at 40° C. for 16 hours.

Example 3: Co-Polymerization of EP by Sonication

The polymerization was similar to the method disclosed in Example 2. However, before injecting the MAO, a sealed reactor containing a reaction pre-mixture was sonicated in the water bath sonicator at a power level of 120 W, at a frequency of 35 kHz for a duration of 1-3 hours. The reaction pre-mixture contained the zirconium complex and the LDH in toluene. The sonicated reaction mixture was subsequently saturated with a feed gas mixture under stirring conditions for 10 minutes. 5 ml MAO was injected to start the reaction. 5 ml MAO co-catalyst was injected to start the polymerization reaction. The reaction was carried out for 30 minutes followed by quenching with 100 ml of methanol containing 5% HCl for 45 minutes. The product was washed with an excess of methanol and filtered, and a final product was obtained after drying at 40° C. for 16 hours.

Example 4: Characterization of the Polymerized Products

Figure 2:
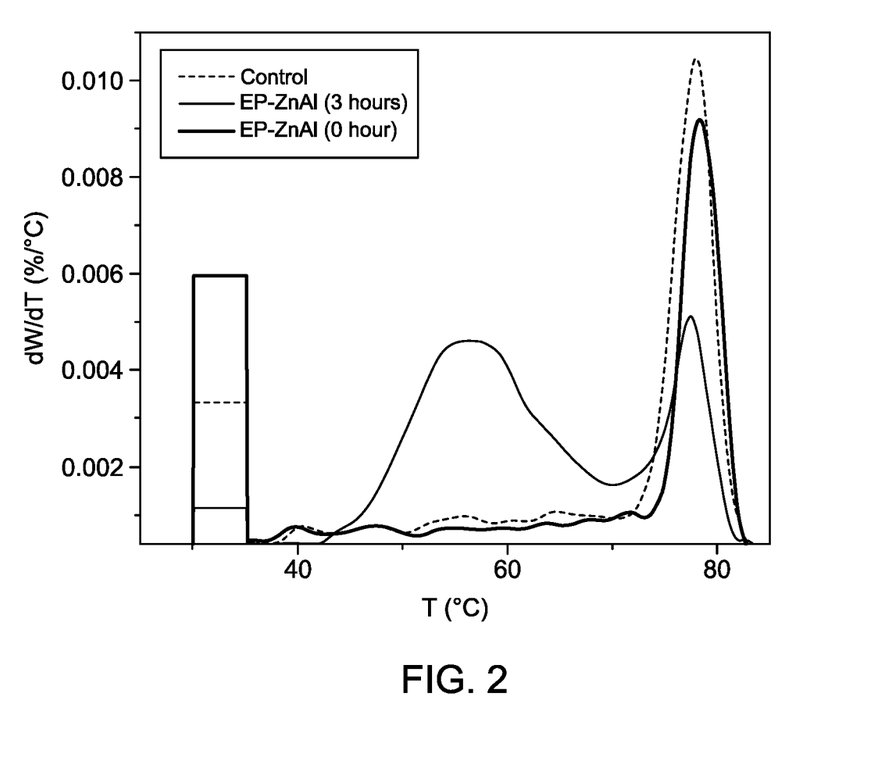
FIG. 2 is a crystallization analysis fractionation (CRYSTAF) plot of various samples, according to certain embodiments of the present disclosure.

Referring to FIG. 2, a CRYSTAF plot of neat EP (control), EP-ZnAl without sonication (EP-ZnAl (0 hour)), and EP-ZnAl with 3 hours sonication (EP-ZnAl (3 hours)) is illustrated. Hereinafter, the control, EP-ZnAl (0 hour), (EP-ZnAl (3 hours) are collectively referred to as the 'samples' or individually referred to as the 'sample', unless otherwise specified. The control is defined throughout as an EP polymer prepared by the same method as Example 2 but without the LDH present in the reaction.

The results indicated that the duration of sonication of the reaction mixture affected the co-polymer properties. From the FIG. 2, it was observed that the control and EP-ZnAl (0 hour) samples without sonication exhibited a single CRYSTAF peak, which was explained as the formation of a unimodal copolymer. The peaks for the control and EP-ZnAl (0 hour) samples were sharp and intense, which showed the presence of molecules having a narrow range of molecular weight. Additionally, the peak position and height of the control and EP-ZnAl (0 hour) samples were in close vicinity, which indicated the samples had a polymer chain of nearly similar molecular mass. The EP-ZnAl (3 hours) exhibited a significant shoulder peak at nearly 55° C. indicating the formation of a bimodal copolymer. The shoulder peak was an attribute of the bimodal composition of the polymer chain and reflected variation in the chemical composition distribution (CCD) of the copolymer.

The above phenomenon was attributed to an effective interaction of the LDH with the catalyst due to the sonication of a reaction solvent. The bimodal behavior of the EP-ZnAl (3 hours) was attributed to the combination of the zinc-aluminum LDH and the sonication. The EP-ZnAl (3 hours) showed high value CCD which can also be referred as short chain branch distribution (SCBD). The sonication assisted polymerization stimulated entrainment of lower molecular weight (MW) or the SCBD and hence produced a polymer with broad copolymers composition distribution. Polymers with high value of the SCBD exhibited relatively low crystallinity than the long chain polymer nanocomposites. Such polymers composite offers ease in processing and can be applied for targeted applications.

Figure 3A:
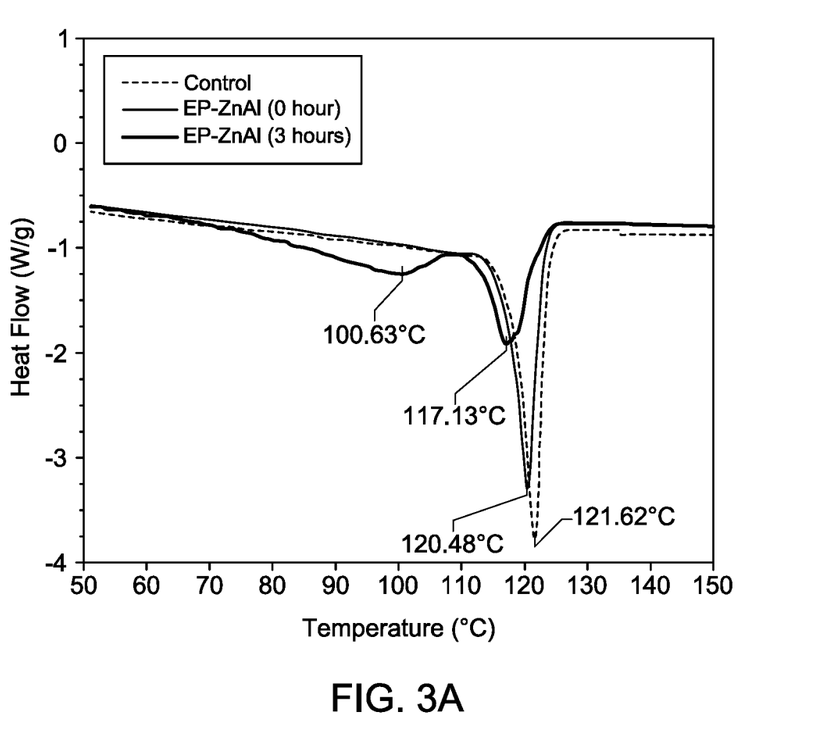
FIG. 3A is a differential scanning calorimetry (DSC) analysis plot depicting a melting temperature ($T_m$) of the various samples, according to certain embodiments of the present disclosure.
Figure 3B:
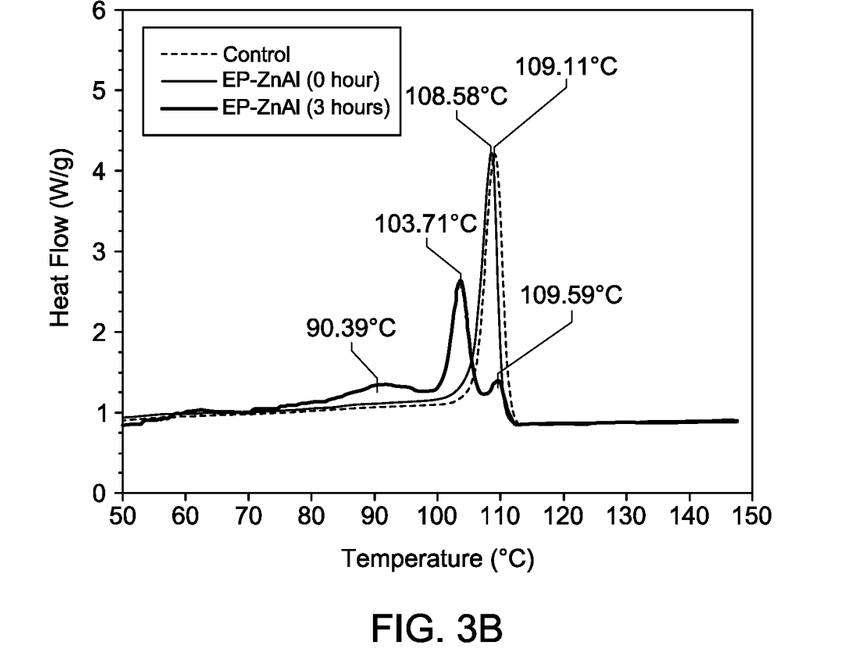
FIG. 3B is a DSC analysis plot depicting a crystallization temperature ($T_c$) of the various samples, according to certain embodiments of the present disclosure.

FIGS. 3A-3B refer to graphs depicting differential scanning calorimetry (DSC) analysis of the samples. The control and EP-ZnAl (0 hour) samples showed a sharp peak during heating and cooling cycles. As shown in the curves, the melting temperature ($T_m$) (FIG. 3A) and crystallization temperature ($T_c$) (FIG. 3B) of the control and EP-ZnAl (0 hour) samples were found to be close in value. As used herein, the term 'melting temperature ($T_m$)' may be referred to as the temperature at which the maximum absorbance change (dA/dT) occurs. Further, the term 'crystallization temperature ($T_c$)' referred to as the temperature at which crystals appear in a solution of a given density as the solution cools.

Similar to the CRYSTAF results, the EP-ZnAl (3 hours) showed an anomaly during the melting cycle and the cooling cycle of the DSC analysis. The melting temperature ($T_m$) value for the EP-ZnAl (3 hours) sample was 117.1° C., which was about 3° C. lower than the control sample. During the heating cycle, a shoulder peak was also observed at 100.6° C. (as shown in Table 1). The cooling cycle of the DSC showed the crystallization temperature ($T_c$) value. The control and EP-ZnAl (0 hour) samples exhibited a sharp single peak have with close $T_c$ values. However, the EP-ZnAl (3 hours) sample had a sharp peak along with two shoulder peaks (FIG. 3B). Three different values of crystallization temperature ($T_c$) (Table 1) were observed for the EP-ZnAl (3 hours) sample.

The shoulder peaks that appeared during the heating and cooling cycles for the EP-ZnAl (3 hours) sample showed the prevalence of high value of the SCBD. This supported the findings observed during the CRYSTAF analysis. The cooling and heating rates in the DSC were 10° C./minute (which was almost 500 times higher than the CRYSTAF cooling rate). Therefore, the shoulder peaks were not well pronounced as CRYSTAF peaks. However, the results encountered in the DSC result showed agreement with the corresponding CRYSTAF results.

TABLE 1

$T_m$ and $T_c$ values for different samples.

| Sample | $T_m$ ° C. | $T_c$ ° C. |
| --- | --- | --- |
| Control | 121.62 | 109.11 |
| EP-ZnAl (0 hour) | 120.48 | 108.58 |
| EP-ZnAl (3 hours) | 100.63, 117.13 | 109.59, 103.71, 90.93 |

The present disclosure provides a method of making the polyolefin nanocomposite using components such as zinc-aluminum LDH and one or more catalysts which are easily available and possess low cost and high stability. The polyolefin nanocomposite includes improved thermal and the mechanical properties. Furthermore, the polyolefin nanocomposites formed by the method of the present disclosure may be used to form polyolefin polymers and/or polyolefin co-polymers having a bimodal molecular weight distribution and/or a lower crystallinity than those formed by conventional methods.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of making a supported catalyst and a polyolefin nanocomposite, comprising:
   combining a zinc salt and an aluminum salt in an aqueous media and refluxing in the presence of an ionic surfactant and an inorganic base, then drying to obtain a zinc-aluminum layered double hydroxide (LDH);
   mixing the zinc-aluminum layered double hydroxide, and a zirconocene complex in a nonpolar solvent to form a first mixture;
   wherein prior to the mixing the zirconocene complex is not supported on the zinc-aluminum LDH;
   sonicating the first mixture for at least one hour to form a homogeneous slurry;
   degassing the homogeneous slurry and adding at least one olefin gas to form a second mixture;
   adding an aluminoxane catalyst to the second mixture and reacting for at least 10 minutes to form a reaction mixture comprising the polyolefin nanocomposite; and
   separating the polyolefin nanocomposite from the reaction mixture;
   wherein the LDH is homogeneously dispersed in the polyolefin nanocomposite.

2. The method of claim 1, wherein the zirconocene complex is dichloro[rac-ethylenebis(indenyl)] zirconium (IV).

3. The method of claim 1, wherein the aluminoxane catalyst is methylaluminoxane.

4. The method of claim 1, wherein the at least one olefin gas is selected from the group consisting of ethene, propene, and butene.

5. The method of claim 1, wherein the at least one olefin gas is 70-95 volume percent (v %) ethene and 5-30 v % propene based on a total volume of the at least one olefin gas.

6. The method of claim 1, wherein the at least one olefin gas has a pressure of 1-10 pound-force per square inch (psi) in the second mixture.

7. The method of claim 1, wherein the first mixture has a weight ratio of the zirconocene complex to the LDH of 1 to 1-10.

8. The method of claim 1, wherein the first mixture has a LDH concentration of 0.1-0.5 milligram per milliliter (mg/mL).

9. The method of claim 1, wherein the sonicating is at a power of 90-130 watts (W).

10. The method of claim 1, wherein the sonicating is at a power of about 120 W.

11. The method of claim 1, wherein the sonicating is at a frequency of about 20-40 kilohertz (kHz).

12. The method of claim 1, wherein the sonicating is at a frequency of about 35 kHz.

13. The method of claim 1, wherein the sonicating is for 1-5 hours.

14. The method of claim 1, wherein the sonicating is for about 3 hours.

15. The method of claim 1, wherein the polyolefin nanocomposite has 0.05 to 3 wt. %, of the LDH relative to a total weight of the polyolefin nanocomposite.

16. The method of claim 1, further comprising:
   mixing the polymer nanocomposite with an olefin feed mixture comprising at least two olefins to form a polyolefin co-polymer having a bimodal molecular weight distribution.

17. The method of claim 16, wherein the polyolefin co-polymer has at least two melting temperatures.

18. The method of claim 16, wherein the polyolefin co-polymer has a melting temperature from 100 to 118 degrees Celsius (° C.).

19. The method of claim 16, wherein the polyolefin co-polymer has a higher short chain branch distribution than a polyolefin co-polymer made by the same method but without sonicating the first mixture.

20. The method of claim 16, wherein the polyolefin co-polymer has a lower crystallinity than a polyolefin co-polymer made by the same method but without sonicating the first mixture.

* * * * *